（12）United States Patent
Matsushita et al.

(10) Patent No.: US 11,088,789 B2
(45) Date of Patent: Aug. 10, 2021

(54) SIGNAL QUALITY MONITORING APPARATUS AND METHOD

(71) Applicants: KABUSHIKI KAISHA TOSHIBA, Minato-ku (JP); Toshiba Infrastructure Systems & Solutions Corporation, Kawasaki (JP)

(72) Inventors: Kenichi Matsushita, Yokohama (JP); Mikihiko Iwaida, Atsugi (JP); Noboru Taga, Kawasaki (JP); Hideki Ono, Kawasaki (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 16/681,891

(22) Filed: Nov. 13, 2019

(65) Prior Publication Data

US 2020/0153568 A1    May 14, 2020

(30) Foreign Application Priority Data

Nov. 13, 2018  (JP) .............................. JP2018-213239

(51) Int. Cl.
*H04L 1/20*    (2006.01)
*H04B 17/10*   (2015.01)
*H04B 17/336*  (2015.01)

(52) U.S. Cl.
CPC .......... *H04L 1/206* (2013.01); *H04B 17/104* (2015.01); *H04B 17/336* (2015.01)

(58) Field of Classification Search
CPC . H04L 1/206; H04L 1/242; H04L 2001/0093; H04B 17/104; H04B 17/336; H04B 17/309
USPC .................................................. 375/227, 295
See application file for complete search history.

(56) References Cited

U.S. PATENT DOCUMENTS

2005/0084033 A1\*  4/2005  Rosen ..................... H04B 1/69
                                                  375/295

FOREIGN PATENT DOCUMENTS

| JP | 2003-111105 A | 4/2003 |
| JP | 2003-283413 A | 10/2003 |
| JP | 2007-221346 A | 8/2007 |
| JP | 2008-219145 A | 9/2008 |

\* cited by examiner

*Primary Examiner* — Fitwi Y Hailegiorgis
(74) *Attorney, Agent, or Firm* — Oblon, McClelland, Maier & Neustadt, L.L.P.

(57) ABSTRACT

According to one embodiment, a signal quality monitoring apparatus includes a signal processor, a comparator and a determiner. The processor obtains output signals from a first transmitter and a second transmitter which are mutually redundant and respectively reproduce digital broadcast signals based on a common origin signal, and generates a first signal based on the output signal from the first transmitter and a second signal based on the output signal from the second transmitter. The comparator compares the first signal and the second signal. The determiner determines a quality of the digital broadcast signal based on a result of the comparison.

7 Claims, 7 Drawing Sheets

SIGNAL QUALITY MONITORING APPARATUS AND METHOD

CROSS-REFERENCE TO RELATED APPLICATIONS

This application is based upon and claims the benefit of priority from Japanese Patent Application No. 2018-213239, filed Nov. 13, 2018, the entire contents of which are incorporated herein by reference.

FIELD

Embodiments described herein relate generally to a signal quality monitoring apparatus and a method thereof.

BACKGROUND

In a digital broadcasting system, it is important to monitor a signal quality of broadcast waves. For example, there is a case where a signal quality is lowered even while broadcast waves are maintained. Such a state is called difficult viewing. The difficult viewing may be caused by a lowered signal quality due to erroneous setting or failure of an apparatus, and C/N (Carrier to Noise Ratio), MER (Modulation Error Rate), BER (Bit Error Rate), etc. are known as indices indicating the signal quality.

In terrestrial digital broadcasting, modulation schemes, such as DQPSK, QPSK, 16QAM (Quadrature Amplitude Modulation), and 64QAM, are used. A 64QAM modulation scheme is a scheme to transmit a signal by changing a carrier wave to 64 kinds of states (symbols) with different amplitudes and phases, and can transmit 6-bit information per symbol.

A diagram expressing a position of each symbol on orthogonal axes is referred to as a constellation (signal point arrangement). When a C/N ratio deteriorates or an effect of disturbance waves, such as noise, is received, the phase and amplitude of the symbol changes, and dispersion of the constellation increases. An index to quantitatively express the degree of the dispersion of the constellation is MER.

In an existing apparatus, for example, since a signal quality is detected in an air region after antenna output, it is difficult to detect items such as frequency shift and delay time that occur inside a transmitting station or a relay apparatus separately from items that occur in an air region. In addition, for example, it is only possible to detect BER, and is difficult to evaluate various indices and items. Since the quality of a digital broadcasting signal is lowered by various factors, it is difficult to identify where such occurred, and a measure to address this problem is desired.

DETAILED DESCRIPTION

In general, according to one embodiment, a signal quality monitoring apparatus includes a signal processor, a comparator and a determiner. The processor obtains output signals from a first transmitter and a second transmitter which are mutually redundant and respectively reproduce digital broadcast signals based on a common origin signal, and generates a first signal based on the output signal from the first transmitter and a second signal based on the output signal from the second transmitter. The comparator compares the first signal and the second signal. The determiner determines a quality of the digital broadcast signal based on a result of the comparison.

Figure 1:
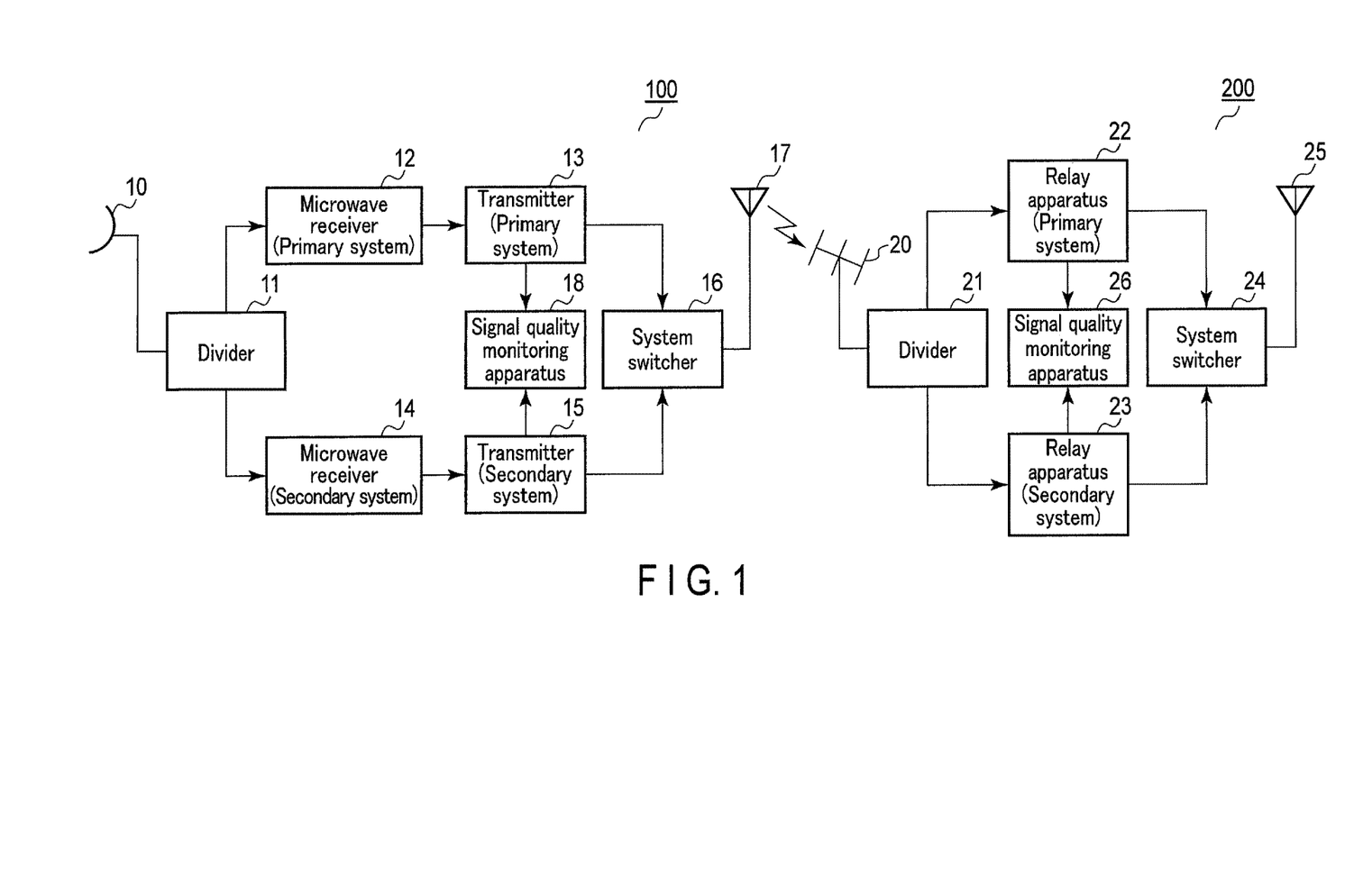
FIG. 1 is a diagram showing an example of a terrestrial digital broadcasting system according to an embodiment.

FIG. 1 is a diagram showing an example of a terrestrial digital broadcasting system according to an embodiment. This system comprises a transmitting station 100 and a relay station 200. (The relay station may be called a satellite station.) The transmitting station 100 converts digital microwaves (an example of an origin signal) received from a broadcasting station into broadcast waves (broadcast signal) of terrestrial digital television broadcast band, and transmits the broadcast waves to an assigned area. The relay station 200 relay-transmits the transmitted broadcast waves.

In the transmitting station 100, digital microwaves received by an antenna 10 are divided and input to a service system (e.g., a primary system) and a redundancy system (e.g., a secondary system) via a divider 11.

In the primary system, the digital microwaves are received and demodulated by a microwave receiver 12, and a transport stream (TS) signal is generated. From this TS signal, broadcast waves (output signal) of a transmission level are generated by a transmitter 13, and are input to a system switcher 16. Similarly, also in the secondary system, digital microwaves from the divider 11 are received and demodulated by a microwave receiver 14, and a TS signal is generated. From this TS signal, broadcast waves (output signal) of a transmission level are generated by a transmitter 15, and are input to the system switcher 16.

The transmitter 13 and the transmitter 15 are redundant with each other, and both of them respectively reproduce broadcast signals based on common digital microwaves. The system switcher 16 connects broadcast waves from either one of the transmitter 13 and the transmitter 15 to a broadcasting antenna 17, and outputs the broadcast waves to a space (air region).

The broadcast waves output from the broadcasting antenna 17 are received by a receiving antenna 20 of the relay station 200, and are divided and input to relay apparatuses 22 and 23 by a divider 21. (The relay apparatus may be called a satellite station.) Similarly, the relay apparatus 22 functions as the primary system while the relay apparatus 23 functions as the secondary system, operating as redundancy systems for each other.

The relay apparatuses 22 and 23 respectively reproduce broadcast waves, amplify the broadcast waves to an output level of the relay apparatuses, and output them to a system switcher 24. The system switcher 24 connects the broadcast waves from either one of the relay apparatuses 22 and 23 to an antenna 25 for relay apparatus. The broadcast waves are thereby relayed.

Herein, the transmitting station 100 comprises a signal quality monitoring apparatus 18 for monitoring the quality of broadcast waves to be transmitted. The signal quality monitoring apparatus 18 obtains broadcast waves output from each of the transmitter 13 and the transmitter 15, and monitors the quality thereof. Similarly, the relay station 200 comprises a signal quality monitoring apparatus 26 for monitoring the quality of broadcast waves to be relay-transmitted. The signal quality monitoring apparatus 26 obtains broadcast waves output from each of the relay apparatuses 22 and 23, and monitors the quality thereof. Herein, the broadcast waves are obtained in the signal quality monitoring apparatus 18 or 26 before being emitted to the air region.

The signal quality monitoring apparatuses 18 and 26 both monitor the signal quality of respective apparatus outputs. Namely, each compares a signal of the primary system and a signal of the secondary system, and monitors a failure of the apparatus. Depending on the contents of the failure, each can give a switching instruction to the system switcher (16, 24) to switch the service system (e.g., a primary system) to the redundancy system (e.g., a secondary system). Next, a plurality of embodiments will be described on the basis of the above configuration.

First Embodiment

Figure 2:
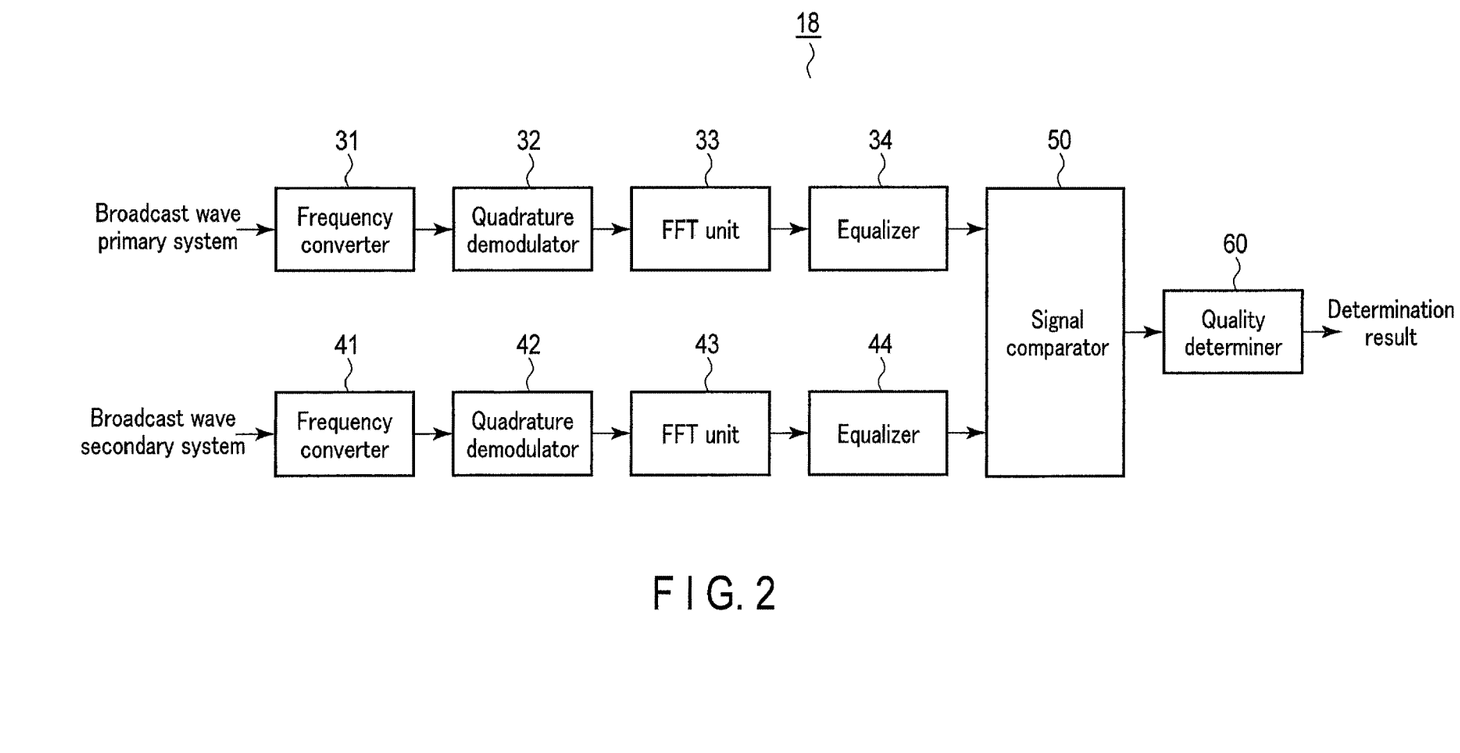
FIG. 2 is a functional block diagram showing an example of a signal quality monitoring apparatus 18 according to the embodiment.

FIG. 2 is a functional block diagram showing an example of the signal quality monitoring apparatus 18 according to an embodiment. In FIG. 2, broadcast waves of the primary system are down-converted into a signal of an intermediate frequency (IF) band by a frequency converter 31, and then are OFDM (Orthogonal Frequency Division Multiplex) demodulated.

Namely, an IF signal from the frequency converter 31 is quadrature-demodulated by a quadrature demodulator 32, and then is subjected to a fast Fourier transformation (FFT) arithmetic process by an FFT unit 33 so as to be converted into a frequency axis signal. After that, an equalizing process using a pilot signal, for example, is performed in an equalizer 34, and a reception constellation signal of the primary system is generated. The frequency converter 31, the quadrature demodulator 32, the FFT unit 33, and the equalizer 34 function as a first demodulator that demodulates an output signal from the transmitter 13 to generate the reception constellation signal.

Similarly, broadcast waves of the secondary system are down-converted into a signal of an IF band by a frequency converter 41, quadrature-demodulated by a quadrature demodulator 42, and then converted into a frequency axis signal by a fast Fourier transformation (FFT) process by an FFT unit 43. Furthermore, an equalizing process is performed in an equalizer 44, and a reception constellation signal of the secondary system is generated. The frequency converter 41, the quadrature demodulator 42, the FFT unit 43, and the equalizer 44 function as a second demodulator that demodulates an output signal from the transmitter 15 to generate the reception constellation signal.

The reception constellation signals of the primary and secondary systems are input to a signal comparator 50 and compared with each other, and a difference in signal is determined in carrier units. Since the reception constellations of the primary and secondary systems have identical signals in a normal state, a difference as a result of comparing them is a small value. On the other hand, if a failure occurs in a transmitter of any system, the difference generated in the constellation signals becomes large, and a comparison result is a large value. A quality determiner 60 acquires this comparison result, determines the presence/absence of a failure based on, for example, a large/small relationship with a predefined threshold value, and outputs a determination result.

Herein, the above-described first demodulator and second demodulator each realize a function as a signal processor. The signal processor obtains broadcast waves from each of the transmitter 13 and the transmitter 15, and generates a reception constellation signal based on an output signal of the transmitter 13 and a reception constellation signal based on an output signal of the transmitter 15.

Figure 3:
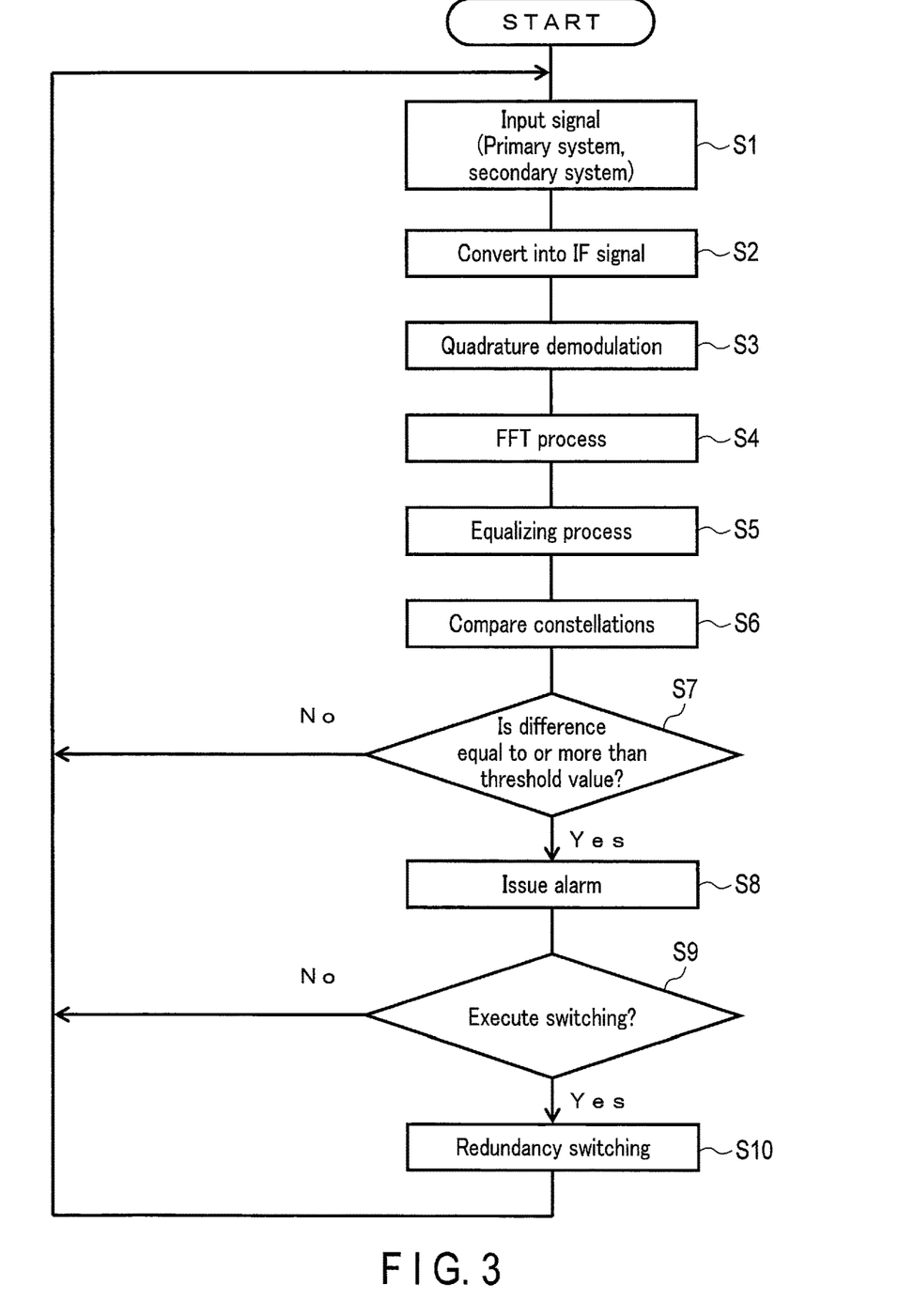
FIG. 3 is a flowchart showing an example of a processing procedure of the signal quality monitoring apparatus 18.

FIG. 3 is a flowchart showing an example of a processing procedure of the signal quality monitoring apparatus 18. The signal quality monitoring apparatus 18 obtains digital broadcast waves of the primary system and digital broadcast waves of the secondary system (step S1), and frequency-converts them into IF signals (step S2). Next, the signal quality monitoring apparatus 18 quadrature-demodulates the IF signals (step S3), and thereafter, reception constellations of respective systems are generated through an FFT process (step S4) and an equalizing process (step S5).

After that, the signal quality monitoring apparatus 18 compares the reception constellations of the primary and secondary systems (step S6), and determines if a difference thereof is equal to or more than a threshold value (step S7). If the difference is less than the threshold value, the processing procedure returns to the beginning.

If the difference between the reception constellations of the primary and secondary systems is equal to or more than the threshold value, the signal quality monitoring apparatus 18 issues an alarm (step S8).

If necessary (Yes in step S9), the signal quality monitoring apparatus 18 executes redundancy switching (step S10) to switch the primary system to the secondary system. If No in step S9, the processing procedure returns to the beginning.

As described above, in the first embodiment, the output signal of the primary system transmitter 13 is OFDM-demodulated to obtain the reception constellation, and similarly, the output signal of the secondary system transmitter 15 is OFDM-demodulated to obtain the reception constellation. Then, the quality of the output signal of the transmitter is determined by comparing the reception constellations of the primary and secondary systems with each other. Namely, it is possible to monitor the identity of the broadcast waves (radio band) and to monitor the validity of the signal by comparing the constellations.

As for the transmitter and the repeater, in particular, the same devices are prepared in a plurality of systems to have a redundant configuration as a precaution against device failure. In the redundant systems, all the systems output the same signals, and when the signals are compared between the systems, the signals must always be identical if the devices are normal. Accordingly, in the embodiment, a failure the cause of which was previously undetectable can be detected by always monitoring the difference in signal between the systems.

Figure 4:
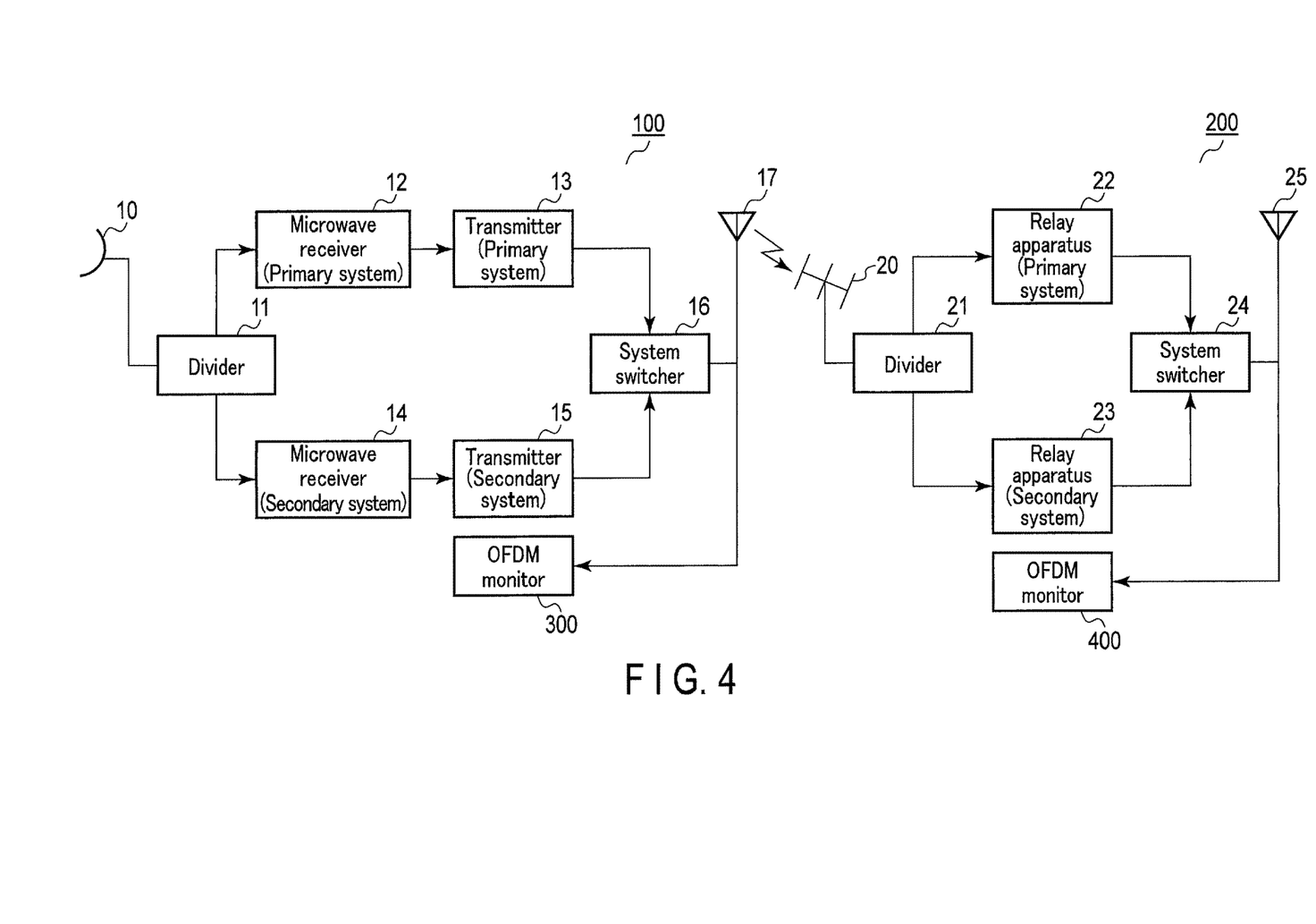
FIG. 4 is a diagram showing an example of an existing signal quality monitoring apparatus for comparison.

FIG. 4 is a diagram showing an example of an existing signal quality monitoring apparatus for comparison. In an existing technique, an OFDM monitor 300 is attached to a system to output digital television broadcast waves of the transmitting station 100, or an OFDM monitor 400 is attached to a system to output digital television broadcast waves of the relay station 200, so as to monitor BER, C/N, frequency accuracy, etc. However, when a modulation parameter of an ISDB-T differs due to failure or erroneous operation of the device, or a device delay differs, there is a case where BER, C/N, and frequency accuracy may not deteriorate. In such a case, a failed state cannot be detected.

In addition, a technique of comparing two broadcast TS signals is also known, but a time deinterleaving process is required to demodulate a broadcast TS signal to be processed to a broadcast TS. For example, in a technique of comparing a broadcast TS from a REMUX device and a reception TS prior to error correction received by a receiver, a time deinterleaving process with a large delay time is required to obtain the reception TS. Accordingly, a process delay would occur, and determination of the signal quality would consume more time accordingly.

In the first embodiment, in contrast, occurrence of a failure can be detected at a high speed by comparing constellation signals prior to the time deinterleaving process, with each other. As compared with demodulating the received broadcast waves to reproduce a TS signal, it is possible to compare signals with each other without an error correction process. Thus, it is possible to improve detection accuracy of a failure by comparing the constellation signals prior to the error correction process.

In the first embodiment, the broadcast waves output from the transmitters 13 and 15 are respectively received, and their reception constellations are compared with each other so as to determine the difference in signal in carrier units. By comparing the reception constellations in carrier units, it is possible to detect an instantaneous failure as compared with an existing technique of determining the presence/absence of a failure by MER.

Namely, by utilizing the respective broadcast waves of the redundant transmitters being identical so as to compare and monitor the respective apparatus outputs, it is possible to find an instantaneous failure of the signal quality without depending only on the index of the signal quality. In addition, it is possible to monitor the identity of the TS signals bit by bit by comparing the TS signals with each other on which the demodulating process has been performed.

Furthermore, depending on the content of a failure, it is possible to analyze how the failure occurred. Thereby, it is possible to specify in detail a factor causing deterioration in the signal quality and a portion (where in transmission and relay the failure has occurred) where the failure has occurred.

From the above, according to the first embodiment, it is possible to provide a signal quality monitoring apparatus capable of detecting a factor causing deterioration in the signal quality and a method thereof.

Second Embodiment

Figure 5:
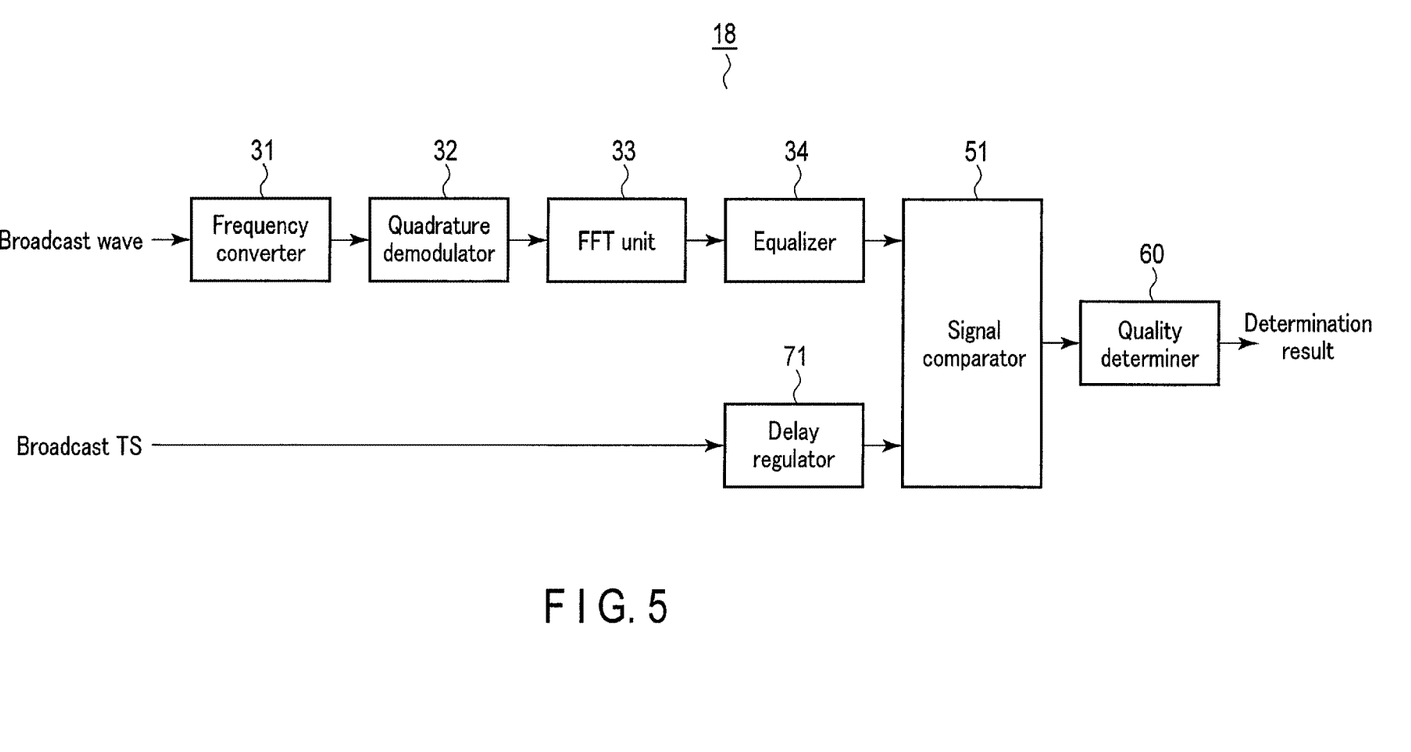
FIG. 5 is a functional block diagram showing another example of the signal quality monitoring apparatus 18 according to an embodiment.

FIG. 5 is a functional block diagram showing another example of the signal quality monitoring apparatus 18 according to an embodiment. In FIG. 5, the portions common to FIG. 2 are denoted with the same reference signs, and only different portions will be described herein.

In FIG. 5, the frequency converter 31, the quadrature demodulator 32, the FFT unit 33, and the equalizer 34 function as a demodulator that demodulates an output signal from the transmitter 13 to reproduce a transport stream signal based on broadcast waves. Namely, the equalizer 34 performs an equalizing process on an output of the FFT unit 33 to generate a reception constellation signal of the primary system. Furthermore, the equalizer 34 performs a forward error correction (Forward Error Correction: FEC) process on the reception constellation signal to reproduce the transport stream signal.

On the other hand, the signal quality monitoring apparatus 18 obtains a broadcast transport stream (TS) supplied via a TTL circuit, etc. from, for example, a microwave receiver of the primary system. This broadcast TS, after a delay amount thereof is regulated by a delay regulator 71, is made in phase with the above reproduced transport stream signal and input to a signal comparator 51. The signal comparator 51 compares the reproduced transport stream signal and the broadcast TS.

In a normal state, signals input to the signal comparator 51 must be the same as each other. Thus, a result of comparing both becomes the same. On the other hand, if a failure occurs in the transmitter of either system, a result of comparing both becomes different. A quality determiner 60 acquires this comparison result, determines the presence/absence of a failure based on, for example, a large/small relationship with a predefined threshold value, and outputs a determination result.

In this way, in the second embodiment, a broadcast TS signal is compared with a broadcast TS signal reproduced by demodulating a digital broadcast signal output from the transmitter 13 of the primary system so as to monitor identity of the signals. Also in this embodiment, since a broadcast TS signal obtained by demodulating a transmitter output signal prior to antenna output is a comparison target, signal quality monitoring accuracy would not be lost. Thus, also according to the second embodiment, it is possible to provide a signal quality monitoring apparatus capable of detecting a factor in deterioration in signal quality and a method thereof.

Third Embodiment

Figure 6:
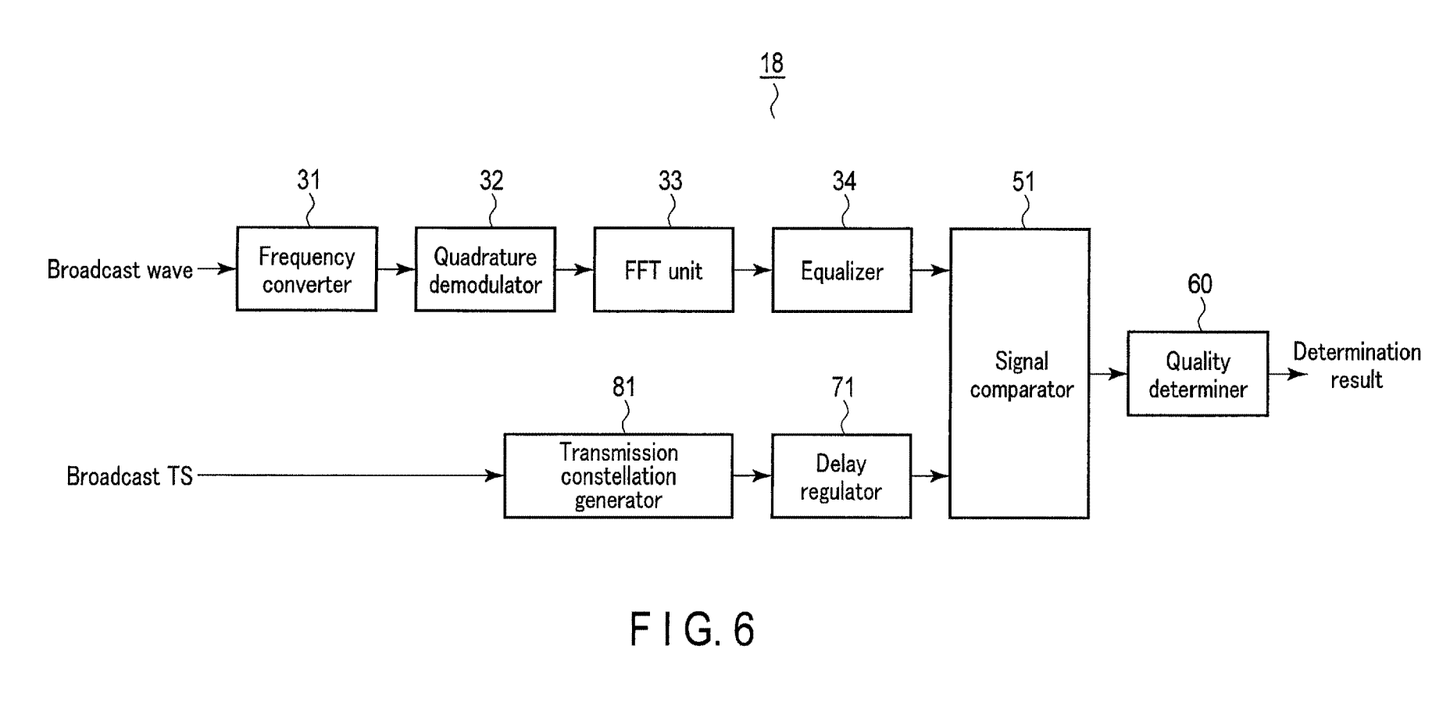
FIG. 6 is a functional block diagram showing another example of the signal quality monitoring apparatus 18 according to an embodiment.

FIG. 6 is a functional block diagram showing another example of the signal quality monitoring apparatus 18 according to an embodiment. In FIG. 6, the portions common to FIG. 2 are denoted with the same reference signs, and only different portions will be described herein.

In FIG. 5, the frequency converter 31, the quadrature demodulator 32, the FFT unit 33, and the equalizer 34 function as a demodulator that demodulates an output signal from the transmitter 13 to generate a reception constellation signal based on broadcast waves. Namely, the equalizer 34 performs an equalizing process on an output of the FFT unit 33 to generate a reception constellation signal of the primary system.

On the other hand, the signal quality monitoring apparatus 18 obtains a broadcast transport stream (TS) supplied via a TTL circuit, etc. from, for example, the microwave receiver of the primary system. This broadcast TS is input to a transmission constellation generator 81. The transmission constellation generator 81 modulates the broadcast TS to generate a transmission constellation signal. This transmission constellation, after a delay amount thereof is regulated by the delay regulator 71, is made in phase with the above generated reception constellation and input to the signal comparator 51. The signal comparator 51 compares the transmission constellation and the reception constellation.

In a normal state, two constellations input to the signal comparator 51 must be the same as each other. Thus, a difference as a result of comparing both is a small value. On the other hand, if a failure occurs in a transmitter of either system, the difference generated in the constellation signals becomes large, and the comparison result is a large value. A quality determiner 60 acquires this comparison result, determines the presence/absence of a failure based on, for example, a large/small relationship with a predefined threshold value, and outputs a determination result.

In this way, in the third embodiment, a transmission constellation generated by modulating a broadcast TS signal is compared with a reception constellation generated by demodulating a digital broadcast signal so as to monitor identity of the signals. Also in this embodiment, since constellations are compared with each other in subcarrier units, even an occurrence of an instantaneous problem can be detected. In addition, since the reception constellation does not require the time deinterleaving process, high-speed detection is possible. Therefore, also according to the third embodiment, it is possible to provide a signal quality monitoring apparatus capable of detecting a factor in deterioration in signal quality and a method thereof.

Fourth Embodiment

Figure 7:
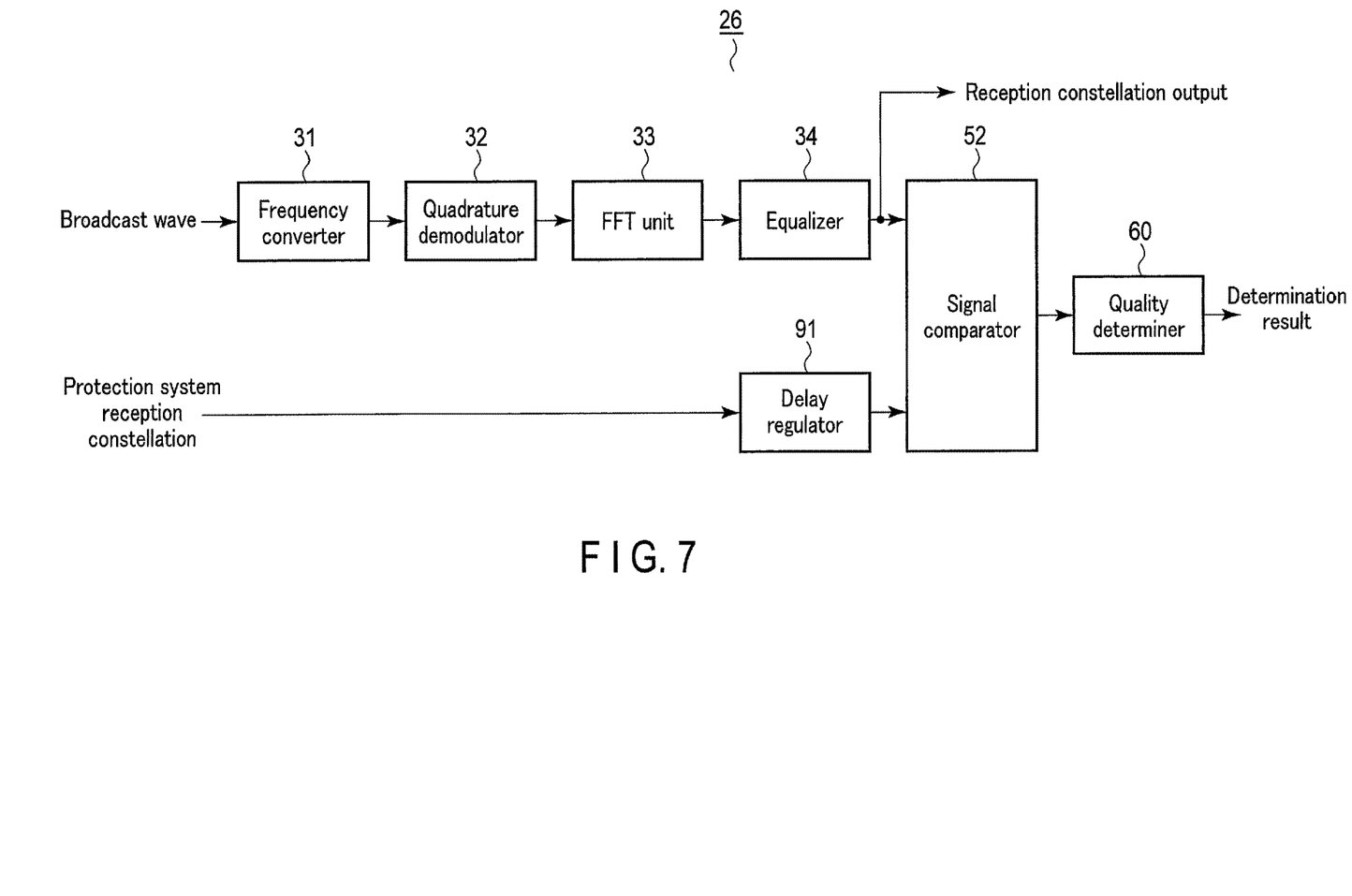
FIG. 7 is a functional block diagram showing another example of a signal quality monitoring apparatus 26 according to an embodiment.

FIG. 7 is a functional block diagram showing an example of the signal quality monitoring apparatus 26 according to an embodiment. In this embodiment, assuming utilization in the relay station 200, signal monitoring in an environment where acquisition of a broadcast TS cannot be expected will be described.

In FIG. 7, the frequency converter 31, the quadrature demodulator 32, the FFT unit 33, and the equalizer 34 function as a demodulator that demodulates an output signal from the relay apparatus 22 to generate a reception constellation signal based on broadcast waves. Namely, the equalizer 34 performs an equalizing process on an output of the FFT unit 33, and generates a reception constellation signal of the primary system. This reception constellation may be obtained from an auxilary terminal, etc. (reception constellation output).

On the other hand, the signal quality monitoring apparatus 18 obtains a reception constellation of the redundancy system. This reception constellation, after a delay amount is regulated by a delay regulator 91, is made in phase with the above generated reception constellation and input to the signal comparator 52. The signal comparator 52 compares two reception constellations with each other.

In a normal state, two constellations input to the signal comparator 52 must be the same as each other. Thus, a difference as a result of comparing both is a small value. On the other hand, in a case where a failure occurs in a relay apparatus of either system, a difference that occurs in the constellation signals becomes large, and the comparison result is a large value. The quality determiner 60 acquires this comparison result, determines the presence/absence of a failure based on, for example, a relationship with a predefined threshold value, and outputs a determination result.

In this way, in the fourth embodiment, a reception constellation of the redundancy system is compared with a reception constellation generated by demodulating a digital broadcast signal so as to monitor identity of the signals. Also in this embodiment, since the constellations can be compared with each other in subcarrier units, even an occurrence of an instantaneous problem can be detected. In addition, since the reception constellation does not require the time deinterleaving process, high-speed detection is possible. Therefore, also in the fourth embodiment, it is possible to provide a signal quality monitoring apparatus capable of detecting a factor in deterioration in signal quality and a method thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal quality monitoring apparatus comprising:
a signal processor configured to obtain output signals from a first transmitter and a second transmitter which are mutually redundant and respectively reproduce digital broadcast signals based on a common origin signal, and generate a first signal based on the output signal from the first transmitter and a second signal based on the output signal from the second transmitter;
a comparator configured to compare the first signal and the second signal; and
a determiner configured to determine a quality of the digital broadcast signals based on a result of the comparison,
wherein the signal processor comprises:
a first demodulator configured to demodulate the output signal from the first transmitter to generate a first constellation signal; and
a second demodulator configured to demodulate the output signal from the second transmitter to generate a second constellation signal, and
wherein the comparator compares the first constellation signal and the second constellation signal.

2. The signal quality monitoring apparatus according to claim 1, wherein the output signals from the first transmitter and the second transmitter are pre-transmission output signals before being output to an air region.

3. A signal quality monitoring apparatus comprising:
a signal processor configured to obtain output signals from a first transmitter and a second transmitter which are mutually redundant and respectively reproduce digital broadcast signals based on a common origin signal, and generate a first signal based on the output signal from the first transmitter and a second signal based on the output signal from the second transmitter:
a comparator configured to compare the first signal and the second signal; and
a determiner configured to determine a quality of the digital broadcast signals based on a result of the comparison,
wherein the signal processor comprises:
a demodulator configured to demodulate the output signal from the first transmitter to generate a first constellation signal; and
a modulator configured to modulate a broadcast transport stream signal to generate a transmission constellation signal, and
wherein the comparator compares the first constellation signal and the transmission constellation signal.

4. The signal quality monitoring apparatus according to claim 3, wherein the signal processor further comprises a delay regulator configured to regulate a delay amount of the first constellation signal and the transmission constellation signal, which are compared by the comparator.

5. A signal quality monitoring apparatus comprising:
a signal processor configured to obtain output signals from a first transmitter and a second transmitter which are mutually redundant and respectively reproduce digital broadcast signals based on a common origin signal, and generate a first signal based on the output signal from the first transmitter and a second signal based on the output signal from the second transmitter;
a comparator configured to compare the first signal and the second signal; and
a determiner configured to determine a quality of the digital broadcast signals based on a result of the comparison,
wherein the signal processor
comprises a demodulator configured to demodulate the output signal from the first transmitter to generate a first constellation signal, and
wherein the comparator compares the first constellation signal and a reception constellation signal of the second transmitter.

6. The signal quality monitoring apparatus according to claim 5, wherein the signal processor further comprises a delay regulator configured to regulate a delay amount of the first constellation signal and the reception constellation signal, which are compared by the comparator.

7. A signal quality monitoring method applied to a signal quality monitoring apparatus configured to obtain output signals from a first transmitter and a second transmitter, which are mutually redundant and respectively reproduce digital broadcast signals based on a common origin signal, the method comprising:
generating, by the signal quality monitoring apparatus, a first signal based on the output signal from the first transmitter;
generating, by the signal quality monitoring apparatus, a second signal based on the output signal from the second transmitter;
comparing, by the signal quality monitoring apparatus, the first signal and the second signal; and
determining, by the signal quality monitoring apparatus, a quality of the digital broadcast signals based on a result of the comparison,
wherein the generating, by the signal quality monitoring apparatus, the first signal demodulates the output signal from the first transmitter to generate a first constellation signal:
wherein the generating, by the signal quality monitoring apparatus, the second signal demodulates the output signal from the second transmitter to generate a second constellation signal, and
wherein the comparing compares the first constellation signal and the second constellation signal.

* * * * *